Patented June 9, 1931

1,808,938

UNITED STATES PATENT OFFICE

GILBERT E. SEIL, OF NEWARK, NEW JERSEY, ASSIGNOR TO THE KOPPERS COMPANY, OF PITTSBURGH, PENNSYLVANIA, A CORPORATION OF PENNSYLVANIA

SULPHUR SLUDGE TREATMENT

No Drawing.   Application filed May 7, 1926. Serial No. 107,522.

This invention relates in general to processes for the treatment of sulphur-bearing sludges and more particularly to improvement in processes for effecting the recovery of mineral material and sulphur from sulphur-bearing foams or sludges such as for example, those produced when the liquids used in certain processes for the removal of $H_2S$ from fuel gas are revivified by aeration after contact with the gas, and in the flotation art, and elsewhere. Aeration of sulphided liquors is usually conducted in such a manner as to cause the liberation of free sulphur, thus preventing hydrogen sulphide from escaping into the atmosphere. In the copending United States application of Frederick W. Sperr, Jr. and David L. Jacobson, Ser. No. 730,676, filed August 7, 1924, there is described a gas purification process which comprises subjecting the gas to be purified to intimate contact with an alkaline solution containing a freshly precipitated iron compound, such as ferric oxide, hydroxide, carbonate and/or sulphide, in suspension, whereby the hydrogen sulphide contained in the gas reacts with the said suspension with resultant suphidation thereof and formation of iron sulphide, sodium hydrosulphide, etc. By aeration of the spent liquid, these compounds are decomposed with formation of free sulphur and regeneration of alkaline and iron compounds presented in the original liquid. Under various conditions as described in the copending application above mentioned and the copending applications of Frederick W. Speer, Jr., Ser. Nos. 21,979, 21,982, and 21,983, all filed April 9, 1925, the free sulphur may be caused either to float to the surface of the liquid as a foam or to settle as a sludge, or it may be recovered by direct filtration of the circulating liquid in which it has accumulated. In any case, it will be seen that due to the nature of the liquid, it is difficult to remove the sulphur without the mechanical entrainment of a certain amount of iron or other compounds which may be in suspension in the liquid. Such entrainment presents certain disadvantages: first, that the solids withdrawn with the sulphur are for the most part useful agents in liquid purification of gas process, which agents must be replaced in order to carry on the process, and second, that the dried sulphur contains a certain percentage of impurities.

An object of the present invention is to treat the sulphur foams, sludges, or cakes, produced in the purification of gas, in such a way as to recover those substances which are useful in the operation of the purification process, and to obtain very pure sulphur, and the invention has for further objects such other operative advantages or results as may be found to obtain in the process hereinafter described or claimed.

The invention is not to be limited in scope to the treatment of the foams or sludges produced by the processes referred to above, for it may be applied with equal success wherever a sulphur bearing sludge containing foreign, insoluble mineral material is to be treated for the recovery of either the foreign mineral material or the sulphur comprising the same, as for example, in the flotation art. Nor is the process limited in use to plants wherein such sludges may be formed incidental to gas purification or any other processes, as the recovery of the valuable constituents of sulphur sludges may be considered a separate industry, serving not only gas purification plants, but also any producers of other similar sludges.

The invention is dependent on the peculiar physical characteristics of sulphur, which may be reduced to a molten condition at a temperature of 120° C., and caused to flow, whereas mineral material existent in the sludge remains solid at this comparatively low temperature.

In the following description it will be assumed that the gas purification or other process is operated in such a way as to produce the free sulphur in the form of a foam or sludge, which is withdrawn from the aerator either continuously or intermittently. The foam produced in such gas purification processes may vary somewhat, but usually carries from 5 to 12 per cent of the sulphur in suspension together with other insoluble solids which may, for instance, amount to about 10 per cent of the total insolubles.

The foam withdrawn from the aerator is preferably allowed to settle in a suitable container, whereby a concentration of the solid material in suspension is effected. This step of the process is preferably conducted in apparatus especially designed to promote such concentration, such as for example a Dorr Thickener, or an Oliver-Borden concentrator or the like. In some cases, however, the concentration can be omitted altogether. After decantation the sludge is passed through a centrifuge or some form of filtering device, such as a plate and frame press or a rotary filter wherein all, or practically all, of the solid material contained in suspension is deposited, and the clarified liquid is returned to the gas purification system. In order to remove any soluble salts adhering to the sulphur cake, the latter is preferably washed with water, the filtrate being concentrated and returned to the purification system, or returned directly, if the value of the dissolved salts warrants it.

In the case of sulphur sludges from gas purification processes, the soluble salts present in the foam may include sodium carbonate, sodium bicarbonate, sodium thiosulphate, sodium thiocyanate, sodium ferrocyanide, soluble catalysts such as organic iron or nickel compounds and the like.

This much of the operation constitutes the first stage of the process, and is intended to produce a crude sulphur cake containing the foreign solid material hereinabove mentioned but free of soluble extraneous materials. Although it is always desirable to recover those insolubles, such recovery may not be feasible in a small gas purification plant producing a limited amount of sulphur and operating with very little labor. Treatment of the cake produced in a plurality of small plants may be accomplished economically by the shipment of such cake to a plant where the subsequent steps of the process are performed, the products being credited or returned to the original plants. Even in a larger plant, conditions of labor and the like may be such as to make it preferable to allow the crude sulphur cake to accumulate, and to treat it at intervals.

The cake if dry is prepared for treatment by mixing with a small amount of water and the resultant sludge is pumped into a filter press. The cake is first washed with steam or hot water at low pressure, the temperature of little more than 100° C. helping to remove any traces of soluble material remaining in the cake, and also to raise the temperature of the press to such a point that excessive condensation will not occur during the subsequent treatment. The filtrate-condensate is usually discarded. When this washing has been carried on for a sufficient length of time to insure a clean deposit of solid material and to raise the temperature of the apparatus to a sufficiently high point, steam, preferably at a pressure of 14 to 15 pounds per square inch and a temperature of 120° C., is admitted to the press where it comes into contact with the cake, and the heat of the steam causes the sulphur to become molten, whereupon it is forced by the pressure within the filtering chamber through porous filtering media. The molten sulphur may be run or sprayed directly into molds, or into a vessel or hearth where it may be kept in the molten state by maintenance of the proper temperature, and from which the steam may be allowed to escape through a suitable trap, and from which the molten sulphur may be tapped at will for casting. Mineral material which was present with the sulphur in the cake will be retained upon the surface of the filtering medium: this may be recovered by dumping, scraping, etc., or suspended in a liquid forced through the filtering medium in reverse direction, or it may be dissolved in a suitable solvent. The solid material is returned to the gas purification system.

In many instances, the performance of this process may be varied in that the two stages are combined, so that the preliminary filtration and subsequent treatment are accomplished in the same apparatus.

In the accomplishment of this process I have found that certain factors must be considered and provided against if the process is to be a success. For example, the temperature control must be within narrow limits, as an increase of temperature causes the molten sulphur to assume a more viscous form, difficult to handle or remove, which might interfere to a marked degree with the operation of the process, and a marked decrease in temperature causes the sulphur to solidify, with a somewhat similar effect. Such a decrease has been observed when the outlet from the filtration apparatus employed in the latter stage was of small diameter and situate in a metal wall of considerable thickness. It was difficult to maintain the desired temperature at this point, and sulphur was discharged in a solid and finely divided form and accumulated to such an extent in the outlet that it clogged the same, causing a stoppage of the press. A device designed to promote an even temperature within the apparatus, such as for example a steam jacket, integral with or surrounding the press, may be used to advantage.

The filtering media are preferably disposed in horizontal planes, the cakes being formed above the same, in order to prevent the molten sulphur from draining from the said filtering surfaces by gravity, which gravity draining would allow free passage of the steam which is not intended, one function of the steam being to force the sulphur through the said surfaces.

The process may be carried out in any plate and frame press or modified Kelly press in which the condition above is adhered to, that is, with the filter cloths disposed horizontally.

The sulphur may be cast into any convenient form for disposal, or it may, by being allowed to spray into the atmosphere, be produced in granular form. I have found that such sulphur is of such a uniform and finely divided nature as to make it especially valuable for many uses.

By the employment of this process, the recovery of substantially pure sulphur and foreign material of a valuable nature from sludge for example such a sludge as is the product of a gas purification process may be accomplished with a minimum of apparatus and effort.

The foreign materials are recovered and may be returned to the gas purification system where their presence is desired, with practically no loss.

The invention as hereinabove set forth is embodied in particular manner but may be variously embodied within the scope of the claims hereinafter made.

I claim:

1. A process for separately recovering sulphur and extraneous mineral material from a sludge containing them, which comprises: removing solubles therefrom by washing the sludge with hot water and steam at atmospheric pressure and filtering the wash water and solubles from the mixture of both sulphur and extraneous material, and subsequently melting the sulphur while on a filtering medium by heat and pressure so as to force the sulphur through the filter medium as it is being melted thereon, whereby the molten sulphur is filtered as it is being melted from the mixture.

2. A process for recovering a solid catalyst from a sulphur-bearing sludge containing it which comprises: depositing the sludge on a filtering surface capable of retaining said catalyst, washing solubles from said sludge through said filtering surface with hot water at a temperature which will not melt the sulphur, then melting the sulphur and filtering the sulphur directly from the sludge containing it and the solid catalyst so as to melt the sulphur from the solid catalyst and force the melted sulphur directly upon melting through the filtering surface as it becomes molten, discharging the molten sulphur and condensate into a hearth, recovering the solid catalyst from the filtering surface and withdrawing the sulphur from said hearth.

3. A process of treating sulphur-bearing sludges from gas purification liquors comprising: washing out and removing only the solubles therefrom without melting the sulphur and returning the solubles to the gas purification liquors; then filtering the sludge with hot water at normal pressure so that the wash water and filtrate flow off from the sulphur through a filter medium; then separating the sulphur from the residual sludge by treating it while on a filter medium with steam alone so that the sulphur filters through the filtering medium as it becomes molten, whereby substantially only the sulphur constituent of the residual sludge on said filter medium passes through the filter medium during such steaming.

4. A process of separately recovering free sulphur and solid extraneous material from sludges containing them and containing soluble material which comprises: passing hot water at low pressure through a mass of said sludge on a filtering medium so as to remove traces of soluble material from said mass of sludge through filter medium, then separating the sulphur from the mass of sludge by bringing steam alone into contact with said mass of sludge while on a filtering medium so that the heat of the steam melts the sulphur of said sludge and the melted sulphur filters through the filter medium as it becomes molten thereon under the pressure of such steam and the solid extraneous mineral material remains on said filtering medium, and thereafter separately collecting the sulphur from one side of said filtering medium and the extraneous mineral material from the other side.

5. A process of separately recovering free sulphur and solid extraneous material from sludge containing them which comprises: washing said sludge on a filtering medium with hot water at low pressure to a temperature of substantially 100° C. and removing the wash water therefrom, then bringing steam alone, at a temperature of substantially 120° C., and under pressure of about 14 to 15 pounds per square inch, into contact with said sludge while on said filtering medium, melting the sulphur of said sludge by the heat of said steam alone and concurrently separating and discharging the melted sulphur from the extraneous solid material of said sludge by subjecting it to filtering by said medium as it becomes molten in the sludge.

6. A process for separately recovering sulphur and a solid catalyst from a sulphur-bearing sludge containing it which comprises: depositing the sludge upon a filtering surface capable of retaining said catalyst, washing said sludge with hot water at a temperature which will not melt the sulphur and so that the filtrate passes off from the sludge through the filtering surface during the washing, and then separating the sulphur from the solid catalyst of the sludge by treating the sulphur while mixed therewith on a filtering surface with steam alone at 120° C. at normal pressure so as to melt and simultaneously force the sulphur through said filter surface as it becomes molten by said steam while leaving the solid catalyst on said filtering surface.

7. A process for separately recovering sulphur and solid extraneous material from a sludge containing the same comprising: depositing the sludge on a filtering medium; bringing steam alone into contact therewith while on said filtering medium to melt the sulphur; and concurrently filtering the melted sulphur away from the sludge through the filtering medium as it melts thereon under the heat of said steam.

8. A process for separately recovering sulphur and solid extraneous material from a sludge containing the same which comprises: depositing the sludge on a filtering medium; bringing steam alone, at a temperature of substantially 120° C., and under pressure of about 14 to 15 pounds per square inch, into contact therewith while on said filtering medium to melt the sulphur; and concurrently filtering the melted sulphur away from the sludge through the filtering medium as it melts thereon under the heat of said steam.

In testimony whereof I have hereunto set my hand.

GILBERT E. SEIL.